United States Patent [19]
Miyake

[11] Patent Number: 5,193,642
[45] Date of Patent: Mar. 16, 1993

[54] ENGINE MOUNTING APPARATUS FOR VEHICLE

[75] Inventor: Hiroshi Miyake, Osaka, Japan

[73] Assignee: Daihatsu Motor Co., Ltd., Osaka, Japan

[21] Appl. No.: 863,959

[22] Filed: Apr. 6, 1992

[30] Foreign Application Priority Data

Jun. 5, 1991 [JP] Japan .................. 3-134123
Jan. 31, 1992 [JP] Japan .................. 4-16464

[51] Int. Cl.$^5$ .................. B60K 5/12
[52] U.S. Cl. .................. 180/312; 180/300; 267/30; 267/262
[58] Field of Search .................. 180/312, 300, 299; 267/30, 262, 152, 36.1; 248/562, 652; 123/192.1

[56] References Cited

U.S. PATENT DOCUMENTS

| | | | |
|---|---|---|---|
| 1,000,494 | 8/1911 | Clément | 123/192.1 |
| 1,701,396 | 2/1929 | Summers | 267/152 |
| 4,377,218 | 3/1983 | Fukushima | 180/300 |
| 4,809,799 | 3/1989 | Ozaki et al. | 180/312 |

FOREIGN PATENT DOCUMENTS

| | | |
|---|---|---|
| 60-64126 | 5/1985 | Japan . |
| 63-95928 | 6/1988 | Japan . |
| 63-142440 | 9/1988 | Japan . |
| 63-201824 | 12/1988 | Japan . |

Primary Examiner—Tamara L. Graysay
Attorney, Agent, or Firm—William H. Eilberg

[57] ABSTRACT

An engine mounting apparatus for a vehicle comprises an arm member projecting from an engine, a shell member mounted to the arm member, an insulator made of a relatively soft elastic material and received in the shell member, and a pin inserted into the insulator and mounted to a vehicle body frame. A resilient member is arranged to extend between the engine and the shell member in an elastically deformed state. One end of the resilient member is made to slidably bear against a suitable portion of the engine, whereas the other end of the resilient member is fixed to the shell member.

7 Claims, 6 Drawing Sheets

ENGINE MOUNTING APPARATUS FOR VEHICLE

BACKGROUND OF THE INVENTION

1. Field of the Invention

This invention relates to an apparatus for mounting an engine to a vehicle body frame in elastically supported condition.

2. Description of the Prior Art

As is well known, an automotive engine vibrates at various frequencies depending on the engine speed. If such vibration is transmitted to the vehicle body without any damping or cushioning, the driver or passengers will feel uncomfortable.

To prevent such a problem, various types of engine mounts have been proposed for mounting the engine in cushioned condition. A typical type of such an engine mount is disclosed in Utility Model Application Laid-open No. 60-64126 or No. 63-95928 for example.

Specifically, the typical prior art engine mount comprises an arm member projecting from an engine, a shell member fixed to the arm member, an insulator made of a relatively soft elastic material and received in the shell member, and a pin inserted through the insulator for fixation to a bracket on a vehicle body frame. Thus, the engine is elastically supported on the vehicle body indirectly through the insulator, so that vibration of the engine is partially absorbed by the insulator before transmission to the vehicle body.

However, the prior art engine mount becomes problematic when the arm member must be made relatively long. Indeed, the arm member is not strictly rigid, and the rigidity of the arm member gradually decreases with increasing length thereof. Thus, the vibration of the engine is transmitted to the shell member as amplified by the inherent elasticity of the arm member, and the amplified vibration is ultimately transmitted to the vehicle body.

Japanese Utility Model Application Laid-open No. 63-142440 discloses the same type of engine mount as described above but which further comprises a special mounting bracket extending from the arm member of the engine for fixation to the shell member, and a dynamic damper mounted on the mounting bracket for reducing vibration of the shell member. The dynamic damper includes a mass member fixed to the mounting bracket via a rubber member. The inertia of the mass member is utilized for counteracting vibration of the shell member.

However, the dynamic damper is effective only in a limited frequency range. In fact, outside the limited frequency range, the dynamic damper amplifies vibration of the shell member due to resonance between the shell member and the dynamic damper. Further, the provision of the dynamic damper requires special configuration of the mounting bracket and the use of the rubber member in addition to increasing weight and mounting space, consequently resulting cost and weight increase.

Japanese Utility Model Application Laid-open No. 63-201824 also discloses a similar engine mount (incorporating an arm member, a shell member, an insulator, and etc.) wherein the arm member and the engine is connected by a vibration preventive stay which has both ends fixedly bolted to the arm member and the engine, respectively. The stay directly prevents excessive vibration of the shell member.

However, because the stay is fixedly bolted to the arm member and the engine, the dimension of the stay must be adjusted on the spot to strictly suit the particular dimensions and configurations of the arm member and engine, so that mounting of the stay is rather troublesome. Further, in case the arm member is made to extend upwardly from the cylinder block of the engine with the stay connecting between the upper end of the arm member and the cylinder head of the engine, dimensional errors of the related components as well as difference in thermal expansion and contraction of the related components will adversely affect the sealing gasket between the cylinder block and the cylinder head. In an extreme case, the gasket may lose its sealing function, thereby leading to combustion gas leakage.

SUMMARY OF THE INVENTION

It is, therefore, an object of the present invention to provide an engine mounting apparatus which is capable of eliminating or alleviating the problems of the prior art.

According to the present invention, there is provided an engine mounting apparatus for a vehicle comprising: an arm member projecting from an engine; a shell member mounted to the arm member; an insulator made of a relatively soft elastic material and received in the shell member; and a pin inserted into the insulator and mounted to a vehicle body frame; wherein one of the arm member and the shell member provides a first support portion while the engine provides a second support portion; and wherein a resilient member is arranged to extend between the first and second support portions in an elastically deformed state, the resilient member having a base end fixed to one of the first and second support portions, the resilient member further having a free end slidably bearing against the other of the first and second support portions.

With the arrangement described above, the resilient member is elastically deformed and has its free end in slidable contact with the first or second support portion. Thus, when the shell member mounted on the arm member tends to vibrate excessively, frictional resistance is generated between the resilient member and the first or second support portion to attenuate or reduce vibration of the shell member. In this way, the shell member is prevented from being excessively vibrated, and this advantage is obtainable over a wide range extending from low to high frequency.

According to the present invention, the resilient member may be made for example of a simple spring plate, so that excessive vibration of the shell member can be effectively prevented without requiring much mounting space and without unduly increasing the overall weight. This makes a sharp contrast against the space-taking dynamic damper which utilizes a weight-increasing mass member.

Further, the resilient member need be fixed (e.g. by bolting) only at its base end with its free end kept freely slidable. Thus, no strict dimensional requirement is imposed on the resilient member and/or the engine and/or the engine mount, and mounting of the resilient member can be greatly facilitated.

Moreover, even if the arm member is made to project from the cylinder block of the engine with the resilient member extending between the cylinder head and the first support portion (the arm member or the shell member), no adverse influences are given to the gasket between the cylinder block and the cylinder head due to the slidable and elastic nature of the resilient member. Indeed, the slidable and elastic nature of the resilient member compensates for difference in thermal expansion and contraction between the related components (the engine, the arm member, and so on).

Preferably, the free end of the resilient member is made to slidably bear against a rounded corner of the first or second support. The provision of the rounded corner enables to increase the frictional resistance generated by slidable bearing of the resilient member, but yet decreases frictional abrasion of the resilient member.

Other objects, features and advantages of the present invention will be clearly understood from the following description of the preferred embodiments given with reference to the accompanying drawings.

DETAILED DESCRIPTION OF THE PREFERRED EMBODIMENTS

Figure 1:
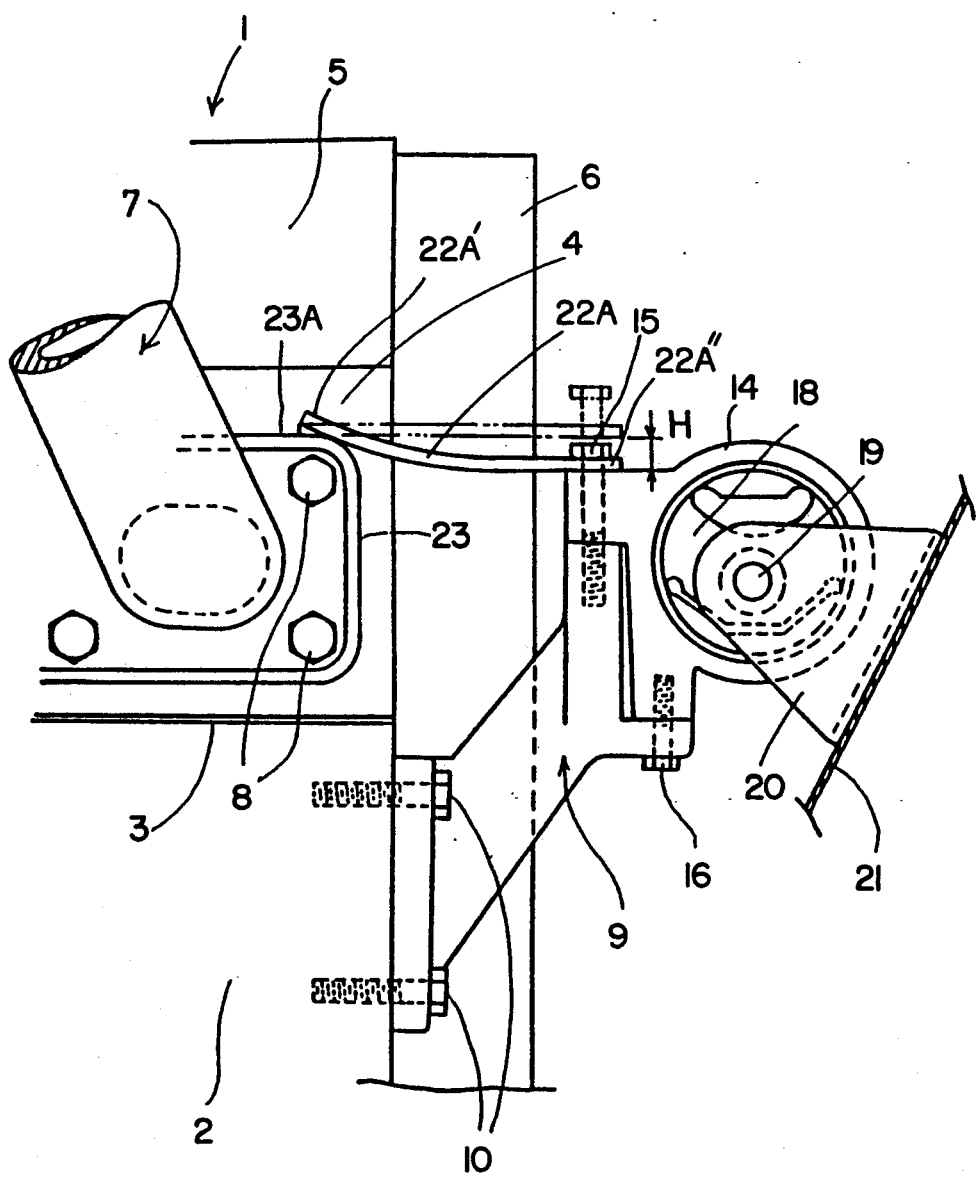
FIG. 1 is a fragmentary front elevational view showing an engine which is mounted a vehicle body frame by an engine mounting apparatus according to the present invention.
Figure 2:
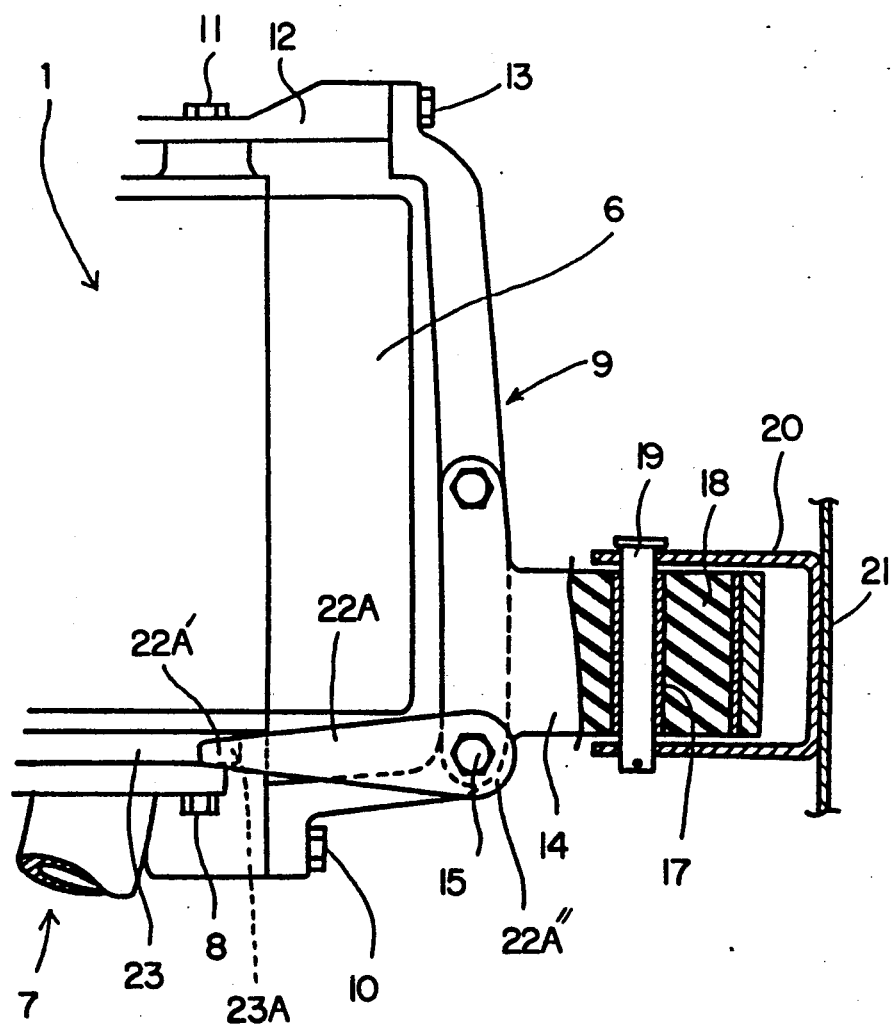
FIG. 2 is a fragmentary plan view, partially in section, showing the same engine mounting apparatus.
Figure 3:
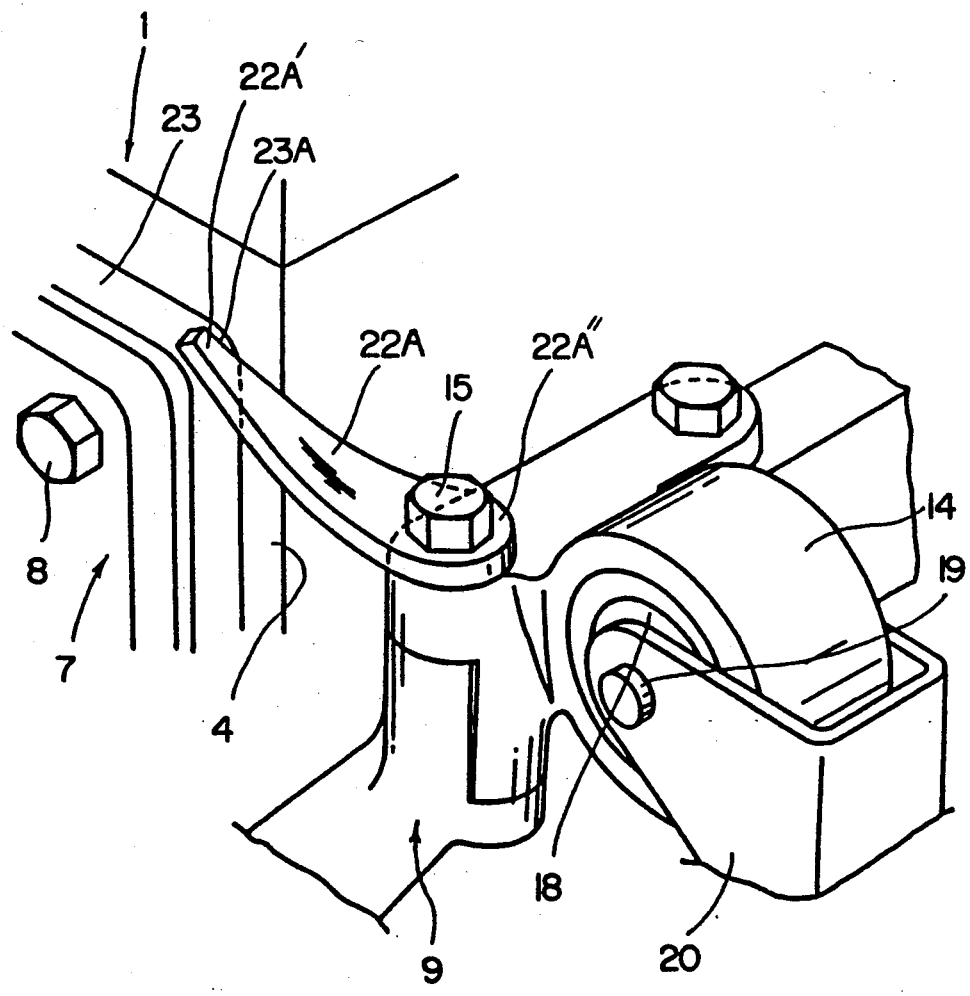
FIG. 3 is a fragmentary perspective view showing a principal part of the same engine mounting apparatus.

Referring to FIGS. 1 through 3, there is illustrated a part of an engine 1 mounted to a vehicle by means of an engine mounting apparatus according to a first embodiment of the present invention. The engine comprises a cylinder block 2 and a cylinder head 4 with a sealing gasket 3 interposed therebetween. The engine further comprises a head cover 5 arranged on the cylinder head 4, a belt cover 6 mounted laterally to the engine for accommodating a timing belt (not shown), and an intake manifold 7 fixed by bolts 8 to an integral boss portion 23 on one longitudinal side of the cylinder head 4.

The engine mounting apparatus includes an arm member 9 having one end fixed laterally to the cylinder block 2 adjacent to one longitudinal side thereof by means of bolts 10. The arm member 9 extends obliquely upward and then horizontally toward the opposite longitudinal side of the cylinder block 2 for connection to a bracket 12 by means of a bolt 13 (see FIG. 2). The bracket 12 is fixed to that opposite longitudinal side of the cylinder block 2 by bolts 11 (only one shown).

The engine mounting apparatus further includes a shell member 14 fixed to an upper intermediate portion of the arm member 9 by bolts 15, 16. The shell member 14 accommodates an insulator 18 made of a relatively soft elastic material such as rubber, and the insulator 18 receives a cylindrical bush 17. A pin 19, which is inserted through the bush 17, has both ends supported by a bracket 20 which in turn is fixed to a vehicle body frame 21. In this way, the engine 1 is elastically supported on the vehicle frame 21 via the insulator 18.

In the embodiment of FIGS. 1-3, there is further provided a resilient member 22a made for example of a steel spring plate for attenuating or damping the vibration of the shell member 14. Specifically, the resilient member 22a has one end 22a' (free end) slidably resting against a rounded corner 23a of the boss portion 23 of the cylinder head 4, whereas the other end 22a'' (base end) of the resilient member 22a is fixed to the shell member 14. Preferably, one of the bolts 15 used for fixing the shell member 14 to the arm member 9 is commonly used for fixing the resilient member 22a to the shell member 14. The resilient member 22a is elastically deformed by a suitable amount H at the time of fixation thereof to the shell member 14, as clearly shown in FIG. 1.

In operation, the engine 1 vibrates with the arm member 9. If the arm member 9 is strictly rigid, the shell member 14 oscillates synchronously with the engine 1, so that there occurs no relative movement between the shell member 14 and the engine 1. In reality, however, the arm member 9 is not strictly rigid, so that the shell member 14 fixed to the arm member 9 vibrates differently from and with a greater degree than the engine 2 if no countermeasure is taken.

According to the embodiment of FIGS. 1-3, the resilient member 22a is elastically deformed and has its free end 22a' slidably resting against the rounded corner 23a of the cylinder head boss portion 23. Thus, when the shell member 14 tends to vibrate differently from the engine 1, frictional resistance is generated between the resilient member 22a and the cylinder head boss portion 23 to attenuate or reduce vibration of the shell member 14. In this way, the shell member 14 is prevented from being excessively vibrated, and this advantage is obtainable over a wide range from low to high frequency.

Further, since the free end 22a' of the resilient member 22a is slidable relative to the cylinder head boss portion 23, no adverse influence is given to the gasket 3 between the cylinder block 2 and the cylinder head 4 even if the arm member 9 and the resilient member 22a are thermally expanded and contracted to different degrees. Thus, the engine 1 is effectively prevented from gas leakage from the combustion chamber (not shown).

Moreover, due to the slidable and elastic nature of the resilient member 22a, no strict dimensional requirement is imposed on the resilient member 22a for mounting thereof. Thus, standardized spring plates may be used for differently dimensioned engines and engine mounts.

Apparently, the rounded corner 23a for slidable contact with the free end 22a' of the resilient member 22a increases frictional resistance but yet reduces frictional abrasion. Thus, the service life of the resilient member is correspondingly increased.

In the embodiment of FIGS. 1-3, the resilient member 22a is shown to have its base end 22a'' fixed to the shell member 14. However, the base end 22a'' of the resilient member may be directly bolted to the arm member 9. Similarly, the free end 22a' of the resilient member may be made to slidably rest against other portion of the engine 1 (the cylinder block 2 an the cylinder head 4).

Figure 4:
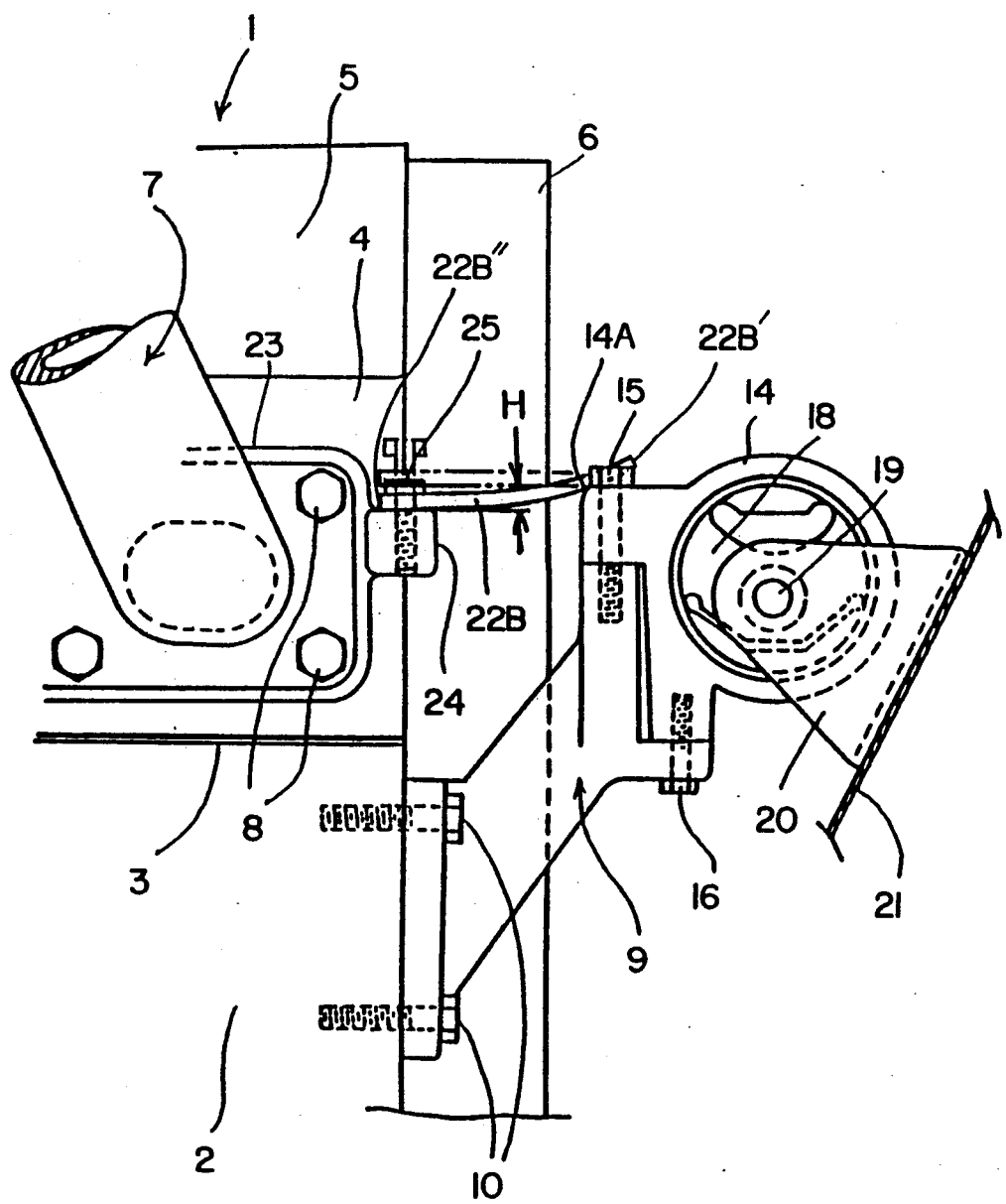
FIG. 4 is a fragmentary front elevational view showing an engine which is mounted a vehicle body frame by another engine mounting apparatus according to the present invention.
Figure 5:
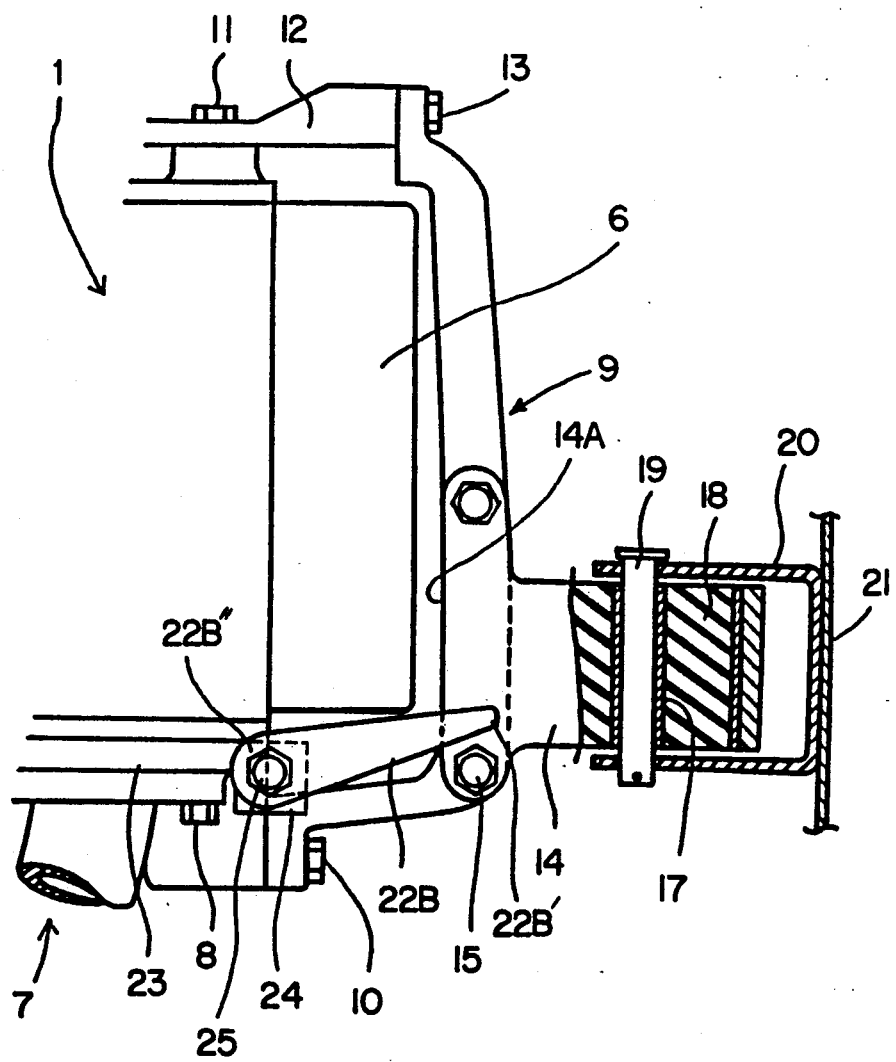
FIG. 5 is a fragmentary plan view, partially in section, showing the engine mounting apparatus of FIG. 4.
Figure 6:
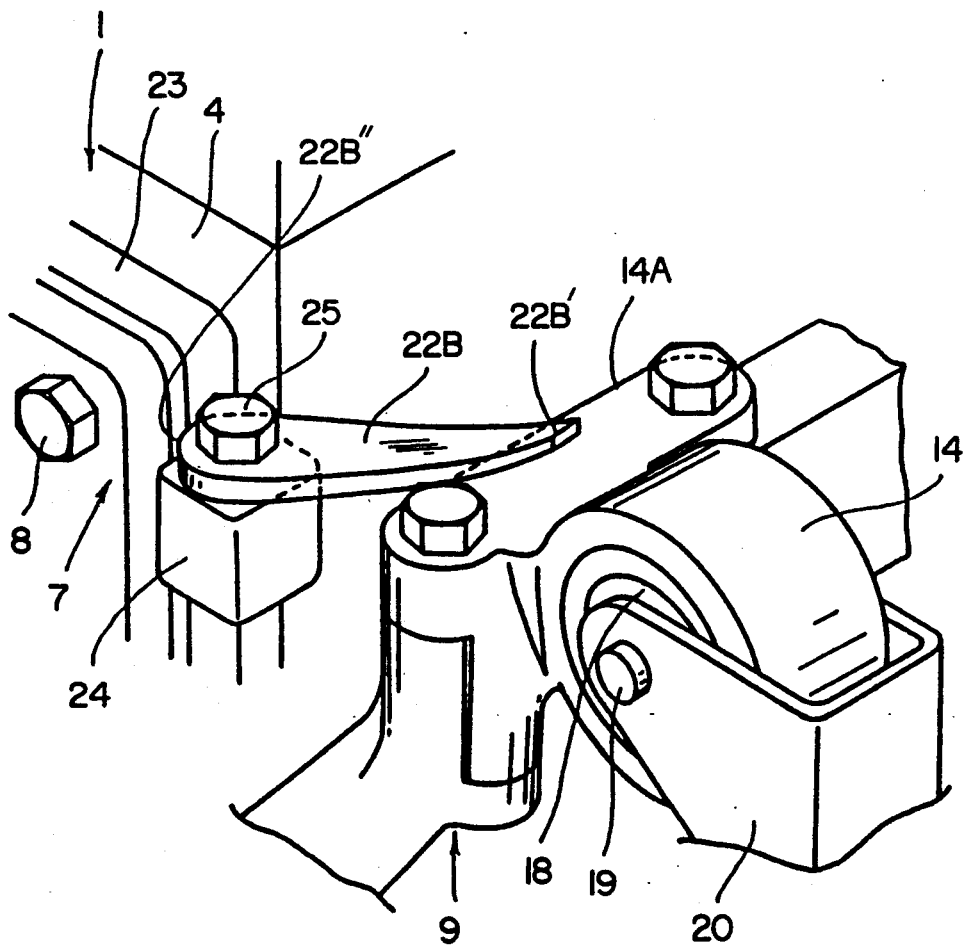
FIG. 6 is a fragmentary perspective view showing a principal part of the engine mounting apparatus of FIG. 4.

FIGS. 4 through 6 show a second embodiment of the present invention which differs from the first embodiment only in the following respects.

Specifically, the boss portion 23 of the engine cylinder head 4 is made to have an integral mounting projection 24, whereas the shell member 14 is made to have a rounded corner portion 14a. A resilient member 22b, which is made for example of a steel spring plate, is arranged to extend between the mounting portion 24 and the shell member 14. One end 22b' (free end) of the resilient member is made to slidably rest against the rounded corner portion 14a of the shell member 14, while the other end 22b" (base end) of the resilient member is fixed to the mounting portion 24 by a bolt 25 in a manner such that the resilient member is elastically deformed by a suitable amount H (FIG. 4).

Obviously, the engine mounting apparatus according to the second embodiment of FIGS. 4–6 functions substantially in the same way as the first embodiment. Of course, the base end 22b" of the resilient member 22b may be fixed to other portion of the engine, and the free end 22b' of the resilient member may be made to slidably bear directly against the arm member 9.

The present invention being thus described, it is obvious that the same may be varied in many ways. Such variations are not to be regarded as a departure from the spirit and scope of the invention, and all such modifications as would be obvious to those skilled in the art are intended to be included within the scope of the following claims.

I claim:

1. An engine mounting apparatus for a vehicle comprising:
    an arm member projecting from an engine;
    a shell member mounted to the arm member;
    an insulator made of a relatively soft elastic material and received in the shell member; and
    a pin inserted into the insulator and mounted to a vehicle body frame;
    wherein one of the arm member and the shell member provides a first support portion while the engine provides a second support portion; and
    wherein a resilient member is arranged to extend between the first and second support portions in an elastically deformed state, the resilient member having a base end fixed to one of the first and second support portions, the resilient member further having a free end slidably bearing against the other of the first and second support portions.

2. The engine mounting apparatus according to claim 1, wherein said other of the first and second support portions is a rounded corner for slidably bearing against the free end of the resilient member.

3. The engine mounting apparatus according to claim 1, wherein the arm member projects from a cylinder block of the engine, the second support portion being provided by a cylinder head of the engine.

4. The engine mounting apparatus according to claim 3, wherein the first support portion is provided by the shell member.

5. The engine mounting apparatus according to claim 4, wherein the base end of the resilient member is fixed to the shell member, whereas the free end of the resilient member slidably bears against the cylinder head of the engine.

6. The engine mounting apparatus according to claim 5, wherein the base end of the resilient member is fixed to the shell member by a bolt which is also used to mount the shell member to the arm member.

7. The engine mounting apparatus according to claim 3, wherein the base end of the resilient member is fixed to the cylinder head of the engine, whereas the free end of the resilient member slidably bears against the shell member.

* * * * *